Aug. 8, 1939.   H. WINOGRAD   2,169,202
ELECTRIC VALVE PROTECTIVE SYSTEM
Filed Aug. 4, 1937
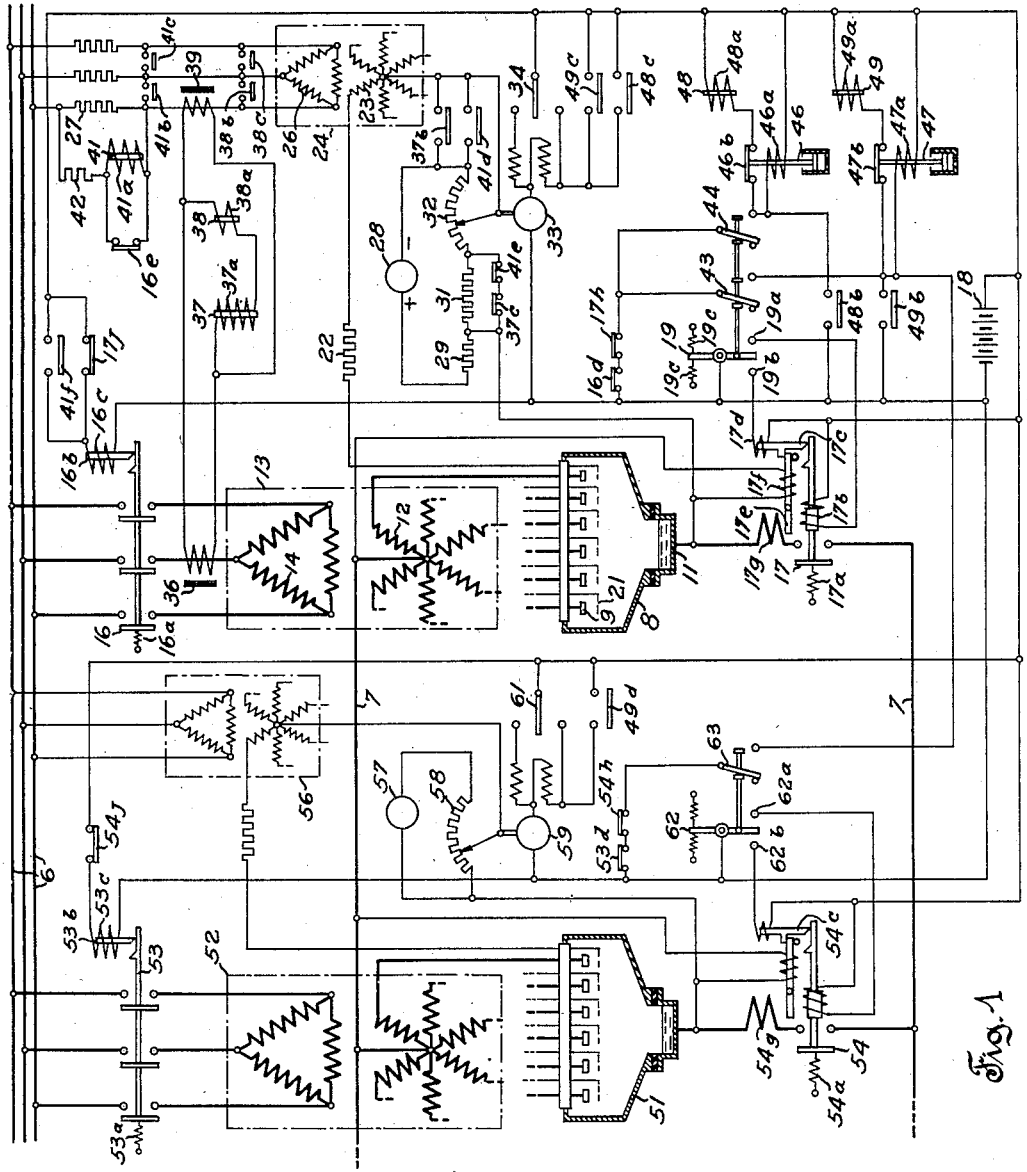
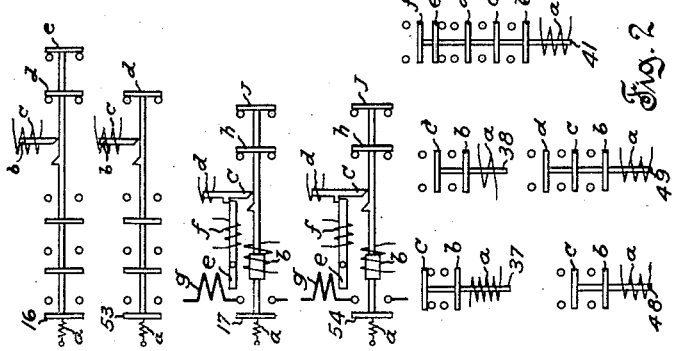
Inventor
H. Winograd
by
Attorney Patented Aug. 8, 1939

2,169,202

UNITED STATES PATENT OFFICE 2,169,202

ELECTRIC VALVE PROTECTIVE SYSTEM

Harold Winograd, Milwaukee, Wis., assignor to Allis-Chalmers Manufacturing Company, Milwaukee, Wis., a corporation of Delaware Application August 4, 1937, Serial No. 157,243

17 Claims. (Cl. 175—363)

This invention relates in general to improvements in electric valve protective systems and more particularly to means for controlling the flow of current through a plurality of interconnected electric valves upon occurrence of a disturbance in one of the valves.

Electric current converting systems frequently comprise a plurality of interconnected valves so arranged that the operation of any one of the valves affects the operation of another valve or even of all the other valves. For example, a plurality of electric valves may be connected in parallel or may be utilized in parallel connected converting systems instead of a single valve, such arrangement being resorted to when it is desired to enlarge an existing installation, or when valves capable of delivering the desired output current are not available, or for other reasons. In such systems the occurrence of a disturbance in one of the valves such as a so-called backfire causes the backfiring valve to form a short circuit across the input circuit and the output circuit of the system. It is then necessary to operatively disconnect the backfiring valve from the sound valves, and it is desirable also to simultaneously reduce the conductivity of the sound valves to avoid overloading such valves and to facilitate the disconnection of the backfiring valve. It is also preferable to reduce the conductivity of the backfiring valve prior to the subsequent reconnection thereof to reduce the danger of occurrence of another backfire therein upon such reconnection.

It is, therefore, one object of the present invention to provide a protective system for a translating system comprising a plurality of electric valves by means of which a valve may be safely disconnected from the system upon occurrence of a disturbance in the valve.

Another object of the present invention is to provide a protective system for a translating system comprising a plurality of electric valves by means of which the conductivity of a valve is decreased upon occurrence of a disturbance in another valve of the system.

Another object of the present invention is to provide a protective system for a translating system comprising a plurality of electric valves by means of which the conductivity of a valve is decreased upon disconnection of such valve from the system.

Objects and advantages other than those above set forth will be apparent from the following description when read in connection with the accompanying drawing, in which:

Fig. 1 diagrammatically illustrates one embodiment of the present invention applied to the control of a plurality of parallel groups of electric valves transmitting current between an alternating current circuit and a direct current circuit; and Fig. 2 diagrammatically illustrates the relationship between the coils and the contacts of some of the relays and switches utilized in the embodiment illustrated in Fig. 1.

Referring more particularly to the drawing by characters of reference, reference numeral 6 designates a source of alternating current such as an alternating current supply line or circuit connected with a suitable generator (not shown). Circuit 6 is to be connected with a direct current output line or circuit 7 through a converting system comprising a plurality of independent parallel elements. One of such converting elements comprises one or more valves generally designated by 8 which is or are provided with anodes 9. When a plurality of valves 8 are utilized, anodes 9 are preferably arranged within a common casing as diagrammatically illustrated in the drawing, and the cathodes of the valves are then combined into a single cathode structure 11 preferably comprising a pool of mercury. Suitable means (not shown) are provided for bringing cathode 11 into electron emitting condition and for maintaining the cathode in such condition as is well known.

Anodes 9 are severally connected with the phase portions of the secondary winding 12 of a supply transformer 13 having a primary winding 14 connected with circuit 6. Transformer 13 is here assumed to be of the polyphase type and may be a unitary structure or may consist of an equivalent plurality of single phase transformers arranged in any of the known connections utilized in converting systems. When valves 8 having a common cathode 11 are utilized, winding 12 is connected in star to provide a neutral point connected with one conductor of circuit 7 and the other conductor of such circuit is connected with the cathode.

Valves 8 are provided with means for causing interruption of the flow of current therethrough and comprising a plurality of switches 16, 17 serially connected with valves 8 and operable for interrupting or otherwise controlling the flow of current therethrough. Switch 16 is inserted in the connection between circuit 6 and winding 14 and is urged toward the open position thereof by means of a spring 16a. The switch may be maintained closed by means of a latch 16b controlled by a trip coil 16c and is also provided with auxiliary contacts 16d, 16e to provide interlocks to be described hereinafter.

Switch 17 is inserted in the connection between valves 8 and one conductor of circuit 7 and is urged toward the open position thereof by means of a spring 17a. Switch 17 may be closed by means of a closing coil 17b which may be energized from a battery 18 through the blade of a switch 19 and the associated contact 19a. Switch 17 may be maintained closed by a latch 17c. The switch may be opened by means of a trip coil 17d which may be connected with battery 18 through switch 19 and contact 19b and which serves to withdraw latch 17c to cause the switch 17 to open. The latch may also be withdrawn by a reverse current relay of the polarized type forming part of switch 17 and comprising an armature 17e, a shunt polarizing coil 17f connected with circuit 7, and a current coil 17g serially connected with the main contacts of the switch. Switch 17 is also provided with interlock contacts 17h and 17j.

Valves 8 are provided with means for controlling the conductivity thereof comprising control electrodes 21 severally associated with anodes 9. The control electrodes are diagrammatically illustrated in the drawing as grids each arranged in or about the path of the discharge occurring between the associated anode and cathode 11 but it will be understood that other types of control electrodes may be utilized. In particular the control electrodes may be of the cathode spot igniting type if the valves are provided with individual mercury cathodes. Valves 8 are assumed to be of the discontinuously controllable or vapor type in which each control electrode prevents the initiation of the flow of current through the associated anode when the control electrode is at a negative potential with respect to the potential of cathode 11 taken as datum for different control potentials. The control electrode then releases the flow of current through the associated anode when the control electrode is brought to a positive potential.

To obtain the above result the different control electrodes are preferably severally connected with cathode 11 through circuits each comprising a current limiting resistor 22 and one of the phase portions of a source of alternating current such as the star connected secondary winding 23 of a control transformer 24. The primary winding 26 of transformer 24 is energized from circuit 6 through a plurality of current limiting resistors 27 to cause impression on control electrodes 21 of potentials rendering valves 8 intermittently conductive. A source of direct current such as a generator 28 is connected with the neutral point of winding 23 and with cathode 11 to cooperate with transformer 24 in controlling the conductivity of valves 8. The connections between generator 28 and winding 23 may be varied by means of a voltage divider comprising a current limiting resistor 29, a resistor 31, and a rheostat 32. Cathode 11 is connected with the voltage divider between resistors 29 and 31 and winding 23 is connected with the tap of rheostat 32. The position of the rheostat tap may be adjusted in the one or the other direction by means of a suitable reversible motor 33 connected with battery 18 through a double throw switch 34.

The conductivity of valves 8 may be reduced to a predetermined extent in response to the occurrence of a backfire either in valves 8 or in any other valve supplying current to circuit 7 by means comprising a current transformer 36 connected between winding 14 and switch 16. The secondary winding of transformer 36 supplies current to the coil 37a of a relay 37 whereby the relay is rendered operable responsive to the flow of current of a value only above a predetermined value through transformer 36, transformer 13, and valves 8 to the backfiring valve. Relay 37 is provided with contacts 37b, 37c controlling the connection of rheostat 32 in such manner as to impress a potential component on control electrodes 21 of such sign and magnitude as to reduce the conductivity of valves 8 upon operation of the relay.

The conductivity controlling means of valves 8 may also be controlled to render valves 8 completely non-conductive and the flow of current through the valve may thus be completely interrupted in response to a backfire in one of valves 8 only by means of current transformer 36 and relay 37 cooperating with additional means comprising a relay 38 having a coil 38a serially connected with coil 37a. Relay 38 is responsive to the flow of current through valves 8 only above a value greater than the value above considered and is provided with contacts 38b, 38c for short circuiting winding 26, whereby the potential impressed from generator 28 on control electrodes 21 through contact 37b is enabled to render valves 8 completely non-conductive. Coils 37a and 38a also receive current from a current transformer 39 arranged in one of the connections between the fixed contacts of relay 38 and resistors 27.

Another relay 41 is provided with a coil 41a connected across one of resistors 27 through a resistor 42 and with a contact 41f in series with trip coil 16c to cause opening of switch 16 in response to an operating condition of valves 8, namely the flow of current of a magnitude above a predetermined value through the valves. Relay 41 is also provided with contacts 41b, 41c for diverting the flow of current from contacts 38b, 38c and from current transformer 39, and with contacts 41d, 41e for taking over the functions of contacts 37b, 37c upon return of relay 37 to the deenergized position.

Switches 16 and 17 are provided with auxiliary contacts including contacts 16d, 17h serially connected with a pair of switches 43, 44 severally connecting the coils 46a, 47a of two time delay relays 46, 47 with battery 18. Switches 43, 44 are actuated by switch 19 through a suitable lost motion mechanism such that switches 43 and 44 close when switch 19 is moved to engage contact 19a and that switches 43, 44 open when switch 19 is moved to engage contact 19b. Switch 19 is returned to an intermediate position by springs 19c without causing further movement of switches 43, 44. Relays 46, 47 are conventionally shown in the drawing as being of the dashpot retarded type but such relays may be of any suitable type operable to open the contacts thereof at the end of an adjustable time interval beginning with the energization of the relay coil. Switch 44 and relay 46 control the connection of battery 18 with the coil 48a of a relay 48. Relay 48 is provided with a plurality of contacts including a holding contact 48b and a contact 48c for connecting motor 33 with battery 18. Relay 47 likewise controls the connection between battery 18 and the coil 49a of a relay 49 having a plurality of contacts including a holding contact 49b and a contact 49c connected in parallel with contact 48c.

The converting element 8, 13 is assumed to be connected in parallel with one or more converting elements such as an element comprising a second group of valves 51 similar to valves 8 and a second transformer 52 similar to transformer 13. Valves 51 may be provided with a control and protective system exactly similar to that provided for valves 8 except that relays 47 and 49 are common to both groups of valves. To simplify the drawing valves 51 are herein assumed to be provided with a simpler set of auxiliary equipment including switches 53 and 54 similar to switches 16 and 17 respectively for disconnecting valves 51 from circuits 6 and 7 upon occurrence of a backfire in such valves. The conductivity of valves 51 may be controlled by means of a transformer 56 similar to transformer 24, a generator 57 similar to generator 28, and a rheostat 58 similar to rheostat 32. The tap of rheostat 58 may be actuated by means of a reversible motor 59 connected with battery 18 through a double throw switch 61. Opening and closing of switch 54 is controlled by a switch 62 similar to switch 19 also controlling a switch 63 similar to switch 43. Switch 63 connects coil 47a with battery 18 through contacts 53d and 54h of switches 53 and 54 respectively. Motor 59 may be connected with battery 18 through contact 49d of relay 49. Any further valves (not shown) utilized in the system may be provided with auxiliary equipment similar to that of valves 8 or to that of valves 51.

The operation of the system will be considered assuming that circuit 6 is energized from the generator (not shown) connected therewith and that the different elements of the system are in the position shown in the drawing. It will be understood, however, that the system may also be utilized when valves 8 and 51 are used for converting direct current supplied to circuit 7 by a suitable generator (not shown) into alternating current to be supplied to circuit 6.

When it is desired to put valves 8 and 51 in operation, the cathodes thereof are first brought into electron emitting condition by ignition of auxiliary arcs maintaining cathode spots on such cathodes as is well known. Switch 16 may then be closed, thereby causing winding 12 to bring anodes 9 sequentially to a positive potential with respect to the potential of cathode 11. Switch 19 may then be moved into engagement with contact 19a to supply current from battery 18 to closing coil 17b of switch 17, thereby causing switch 17 to close. Movement of switch 19 also closes switches 43 and 44, but such closure is momentarily without effect because contact 16d in series with the switches has been opened upon closure of switch 16. Upon closure of switch 17, anodes 9 sequentially supply current to circuit 7 and the successive anode current impulses combine at cathode 11 to form a flow of direct current as is well known. The voltage under which such current flows in circuit 7 may be regulated from a maximum value to a series of lesser values which may include zero by delaying the moments of initiation of the flow of current through the several anodes.

If rheostat 32 is so adjusted as to impress a relatively low negative potential component from generator 28 on control electrodes 21, the alternating potential component impressed on each control electrode by winding 23 may cause each control electrode to become positive with respect to cathode 11 at the moment of the voltage cycle of circuit 6 at which the associated anode 9 becomes positive or even at an earlier moment of the cycle. The control electrodes then have no regulating effect on the voltage impressed on circuit 7, which voltage may be taken as a measure of the conductivity of valves 8, and the conductivity of the valves is at a maximum value. The tap of rheostat 32 may be displaced by motor 33 upon connection of the motor with battery 18 through switch 34. This displacement may be effected in such sense as to increase the negative unidirectional potential impressed on control electrodes 21 from generator 28, thus retarding the moments of initiation of the flow of current through anodes 9. As is well known, the result of retarding the periods of current flow through the anodes is to reduce the voltage impressed on circuit 7 through valves 8 or, in other words, to reduce the conductivity of valves 8.

Valves 51 may likewise be connected in the system by closure of the switches 53 and 54. Closure of switch 54 is obtained by moving switch 62 into engagement with contact 62a, thereby also causing closure of switch 63. The circuit of switch 63 is, however, then opened at contact 53d and the closure of switch 63 is therefore momentarily without effect. Rheostats 32 and 58 should be so adjusted that the two groups of valves have substantially equal conductivities in order that the valves may carry current simultaneously and share the load current in the desired proportion. It will be understood that any other valves (not shown) forming part of the system may also be rendered operative in a similar manner.

Upon occurrence of a backfire in one of valves 51 such valves substantially short circuit both circuits 6 and 7. Valves 8 and any valves other than valves 51 connected in parallel therewith then supply current to such short circuit through the connection established between the groups of valves by the conductors of circuit 7, and the current in valves 8 and in current transformer 36 rapidly increases to a predetermined value depending on the adjustment of rheostat 32. Relays 37 and 38 are so adjusted that the current supplied thereto is then above the value required for operation of relay 37 but below the value required for operation of relay 38. Relay 37 accordingly operates alone to first open contact 37c and immediately thereafter to close contact 37b. As a result of such operation the unidirectional potential component impressed from generator 28 on control electrodes 21 is increased and the conductivity of valves 8 is decreased to an extent depending on the degree of variation of the potential component. The flow of current supplied from valves 8 to the backfiring valve 51 is thus reduced in magnitude to any desired extent. The currents supplied from any other valves of the system are also reduced in magnitude in a manner similar to that above described. The joint valve current flows through coil 54g of the reverse current relay of switch 54 and the relay releases latch 54c. Switch 54 thereupon opens under the action of spring 54a and interrupts the current flowing therethrough at the time of such opening. As above explained such current is, however, of considerably smaller value than would obtain if the conductivity of the valves had not been reduced by means of relay 37 so that the duty of switch 54 is considerably lessened and valves 51 are thereby safely disconnected from circuit 7. Switch 54 also closes contact 54j connecting trip coil 53c with battery 18. The trip coil withdraws latch 53b, thus permitting switch 53 to open under the action of spring 53a. Transformer 52 is thereby disconnected from circuit 6 and the flow of current through valves 51 ceases completely.

Valves 8 thereupon continue to operate and supply current including at least part of the current theretofore supplied by valves 51 to circuit 7 and to the load devices connected therewith. Such flow of current is of insufficient magnitude to maintain relay 37 in the attracted position and the relay returns to the position shown to return the conductivity of valves 8 to the initial value thereof. Upon opening of switches 53 and 54 however, a circuit is completed from battery 18 through contacts 53d, 54h, switch 63 and through coil 47a in parallel with contacts 47b and coil 49a back to the battery. Relay 49 being thus energized closes holding contact 49b and contacts 49c and 49d. Contact 49b maintains relays 47 and 49 energized even if switches 53 and 54 are immediately reclosed.

Contact 49c connects motor 33 with battery 18 and the motor actuates the tap of rheostat 32 in response to opening of switches 53, 54 to vary the potential component impressed from generator 28 on control electrodes 21. This variation is effected in such sense as to impart a negative increment to the potential component to delay the periods of current flow through valves 8 and thus reduce the conductivity of the valves. Motor 33 operates as long as contact 49c remains closed. After a time delay of a length depending on the adjustment of relay 47, such relay opens contact 47b whereby relay 49 is deenergized and returned to the position shown. Motor 33 then stops and leaves the tap of rheostat 32 in a predetermined position corresponding to a predetermined variation of the potential impressed on control electrodes 21. It will be understood that motor 33 may also be caused to stop at a predetermined position prior to return of relay 47 to the position shown by means of suitable limit switches as is well known. Valves 8 then supply current to circuit 7 under a reduced voltage which may be adjusted to such magnitude that the valves will not be overloaded.

Closure of contact 49d causes motor 59 to operate similarly to motor 33 to permanently reduce the conductivity of valves 51 to a predetermined extent in response to opening of switches 53, 54. The purpose of such operation is to prevent valves 51 from suddenly taking over the entire load current from valves 8 upon reclosure of switches 53, 54, which action might cause valves 51 to backfire anew. If motors 33 and 59 are so adjusted as to reduce the conductivities of valves 8 and 51 to a common value, valves 51 will carry their proper share of the load current upon closure of switches 53, 54. Switches 53, 54 may accordingly be closed and contacts 53d and 54h thereof open the circuit of coil 47a to cause the relay 47 to return to the position shown. The conductivities of both groups of valves may then be returned to the original common value thereof by closing switches 34 and 61 to cause motors 33 and 59 to return the taps of rheostats 32 and 58 to the original positions thereof. The system is then returned to the normal operating condition above described.

If a backfire occurs in one of valves 8 such valve substantially short circuits circuits 6 and 7. Valves 51 accordingly supply a large current to the backfiring valve through switch 54, switch 17, cathode 11, backfiring anode 9 and the associated portion of winding 12, and transformer 52 back to valves 51, and any other valves connected in parallel therewith likewise supply current to the backfiring valve. The flow of such current through coil 17g causes opening of switch 17, thereby disconnecting valves 8 from circuit 7.

At the same time the flow of current through transformer 36, transformer 13, and valves 8 increases to a value greater than the value of such current resulting from a backfire in valves 51 and also greater than the value required for causing operation of relay 38. Relay 37 operates first in the manner above described to impress a negative potential component on control electrodes 21 of valves 8. Relay 38 operates immediately thereafter to close contacts 38b, 38c thereof, thereby short circuiting winding 26 to suppress the alternating potential component previously impressed on control electrodes 21. Such control electrodes are then continuously maintained at a negative potential from generator 28 through contact 37b and render valves 8 entirely nonconductive to prevent any further flow of current impulses from the sound anodes 9 to the backfiring anode.

As a result of the closure of contacts 38b, 38c a relatively large current flows from circuit 6 through such contacts and through resistors 27. Such current flows through the primary winding of current transformer 39 which maintains coils 37a and 38a energized even after cessation of the flow of current through current transformer 36, transformer 13, and valves 8. A portion of the current flowing through resistors 27 flows through coil 41a and causes operation of relay 41. Such relay closes contact 41d and opens contact 41e to relieve contacts 37b and 37c of further duty. Relay 41 also closes contacts 41b and 41c to relieve contacts 38b and 38c of further duty and to divert the flow of current from current transformer 39. Coils 37a, 38a are thereby deprived of current and relays 37 and 38 return to the position shown. Relay 41 also closes contact 41f which connects trip coil 16c of switch 16 with battery 18 to cause opening of switch 16. Switch 16 thereupon closes contact 16e which short circuits coil 41a to cause relay 41 to return to the position shown.

Opening of switches 16 and 17 causes a circuit to be established from battery 18 through contacts 16d, 17h, switch 43 and through coil 47a in parallel with contact 47b and coil 49a back to the battery. Relays 47 and 49 are thus energized to operate in the above described manner to reduce the conductivities of valves 8 and 51. Operation of switches 16, 17 also causes a circuit to be completed from battery 18 through contacts 16d, 17h, switch 44 and through coil 46a is parallel with contact 46b and coil 48a back to the battery. Relay 48 accordingly operates in response to opening of switches 16, 17 to close holding contact 48b and contact 48c. Contact 48c, which is connected in parallel with contact 49c, controls the operation of motor 33 to reduce the conductivity of valves 8 in the manner above described with respect to contact 49c.

Relay 46 is, however, adjusted for a time delay which is greater than the time delay of relay 47. Motor 33 accordingly continues to operate for a predetermined time interval after contact 49c opens and after contact 49d opens to stop motor 59. The conductivity of valves 8 is thereby reduced a predetermined amount below the conductivity of valves 51. As a result thereof, when switches 16, 17 are reclosed valves 8 do not carry any current and switch 34 may be closed to cause motor 33 to gradually reduce the negative potential impressed on control electrodes 21 and to thus gradually increase the conductivity of valves 8. The flow of current through valves 8 may then be reestablished gradually so as to reduce the danger of such valves backfiring anew. Closure of switches 16, 17 also causes relays 46, 47 to return to the position shown and the system is returned to the normal operating condition above described. The conductivity of the valves may then be returned to the original value thereof to return the voltage of circuit 7 to the normal value thereof.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In an electric translating system, the combination with an electric valve and means for controlling the conductivity of said valve, of means responsive to the flow of current only above a predetermined value through said valve for controlling said conductivity controlling means to reduce the conductivity of said valve a predetermined constant extent above zero, and means responsive to the flow of current only above a predetermined value greater than the first said predetermined value through said valve cooperating with the first said current responsive means in controlling said conductivity controlling means to render said valve non-conductive.

2. In an electric translating system, the combination with an electric valve and a second electric valve connected with the first said valve, of means for controlling the conductivity of the first said valve responsive to the occurrence of a backfire in the second said valve for reducing the conductivity of the first said valve and responsive to the occurrence of a backfire in the first said valve for rendering the first said valve non-conductive.

3. In an electric translating system, the combination with an electric valve, means for controlling the conductivity of said valve, and a second electric valve connected with the first said valve, of means responsive to the occurrence of a backfire in either one of said valves for controlling said conductivity controlling means to reduce the conductivity of the first said valve, and means responsive to the occurrence of a backfire in the first said valve only for controlling said conductivity controlling means to render the first said valve non-conductive.

4. In an electric translating system, the combination with an electric valve, means for controlling the conductivity of said valve, and a second electric valve connected with the first said valve, of means responsive to the occurrence of a backfire in either one of said valves for controlling said conductivity controlling means to reduce the conductivity of the first said valve, and means responsive to the occurrence of a backfire in the first said valve only for cooperating with the first said backfire responsive means in controlling said conductivity controlling means to render the first said valve non-conductive.

5. In an electric translating system, the combination with an electric valve having an anode, a control electrode and a cathode, and a source of alternating current connected with said control electrode and with said cathode to render said valve intermittently conductive, of means comprising a source of direct current and means responsive to the flow of current only above a predetermined value through said valve for impressing a potential component from said source of direct current on said control electrode of such sign and magnitude as to reduce the conductivity of said valve a predetermined constant extent above zero, and means responsive only to the flow of current only above another predetermined value greater than the first said predetermined value through said valve for short circuiting said source of alternating current, whereby the said potential impressed on said control electrode renders said valve non-conductive.

6. In an electric translating system, the combination with an electric valve having an anode, a control electrode and a cathode, a source of alternating current connected with said control electrode and with said cathode to render said valve intermittently conductive, and a source of direct current connected with said source of alternating current and with said cathode to cooperate with said source of alternating current in controlling the conductivity of said valve, of means responsive to the flow of current only above a predetermined value through said valve for impressing a negative potential component from said source of direct current on said control electrode to reduce the conductivity of said valve, and means responsive to the flow of current only above another value greater than the first said value through said valve for short circuiting said source of alternating current, whereby said potential renders said valve non-conductive.

7. In an electric translating system, the combination with an electric valve having an anode, a control electrode and a cathode, a switch serially connected with said valve for controlling the flow of current therethrough, and a source of alternating current connected with said control electrode and with said cathode to render said valve intermittently conductive, of means comprising a source of direct current and means responsive to the flow of current only above a predetermined value through said valve for impressing a potential component on said control electrode of such sign and magnitude as to reduce the conductivity of said valve, means comprising a relay responsive to the flow of current only above another value greater than the first said value through said valve and having contacts for short circuiting said source of alternating current, whereby the said potential impressed on said control electrode renders said valve non-conductive, and means controlled by said relay for causing opening of said switch.

8. In an electric translating system, the combination with an electric valve having an anode, a control electrode and a cathode, a switch serially connected with said valve for controlling the flow of current therethrough, a source of alternating current connected with said control electrode and with said cathode to render said valve intermittently conductive, a source of direct current connected with said source of alternating current and with said cathode to cooperate with said source of alternating current in controlling the conductivity of said valve, and means responsive to an operating condition of said valve for causing opening of said switch, of means responsive to opening of said switch for varying the potential component impressed from said source of direct current on said control electrode to reduce the conductivity of said valve.

9. In an electric translating system, the combination with an electric valve having an anode, a control electrode and a cathode, a source of alternating current connected with said control electrode and with said cathode to render said valve intermittently conductive, a source of direct current connected with said source of alternating current and with said cathode to cooperate with said source of alternating current in controlling the conductivity of said valve, and means for causing interruption of the flow of current through said valve, of means responsive to operation of said current interrupting means for adjusting the value of the potential component impressed from said source of direct current on said control electrode to reduce the conductivity of said valve.

10. In an electric translating system, the combination with an electric valve having an anode, a control electrode and a cathode, a source of alternating current connected with said control electrode and with said cathode to render said valve intermittently conductive, a source of direct current connected with said source of alternating current and with said cathode to cooperate with said source of alternating current in controlling the conductivity of said valve, means for causing interruption of the flow of current through said valve, and means responsive to an operating condition of said valve for causing operation of said current interrupting means, of means responsive to operation of said current interrupting means for adjusting the value of the potential component impressed from said source of direct current on said control electrode to reduce the conductivity of said valve.

11. In an electric translating system, the combination with an electric valve, means for causing interruption of the flow of current through said valve, a second electric valve connected with the first said valve, and means for controlling the conductivity of the second said valve, of means responsive to operation of said current interrupting means for controlling said conductivity controlling means to reduce the conductivity of the second said valve a predetermined constant extent above zero.

12. In an electric translating system, the combination with an electric valve, a switch serially connected with said valve for controlling the flow of current therethrough, a second electric valve connected with the first said valve, and means for controlling the conductivity of the second said valve, of means responsive to opening of said switch for controlling said conductivity controlling means to reduce the conductivity of the second said valve a predetermined constant extent above zero.

13. In an electric translating system, the combination with an electric valve, a second electric valve connected wtih the first said valve, means for controlling the conductivities of said valves, and means for causing interruption of the flow of current thrugh one of said valves, of means responsive to operation of said current interrupting means for controlling said conductivity controlling means to reduce the conductivity of each of said valves a predetermined constant extent above zero.

14. In an electric translating system, the combination with an electric valve, means for controlling the conductivity of said valve, a second electric valve connected with the first said valve, means for controlling the conductivity of the second said valve, and means for causing interruption of the flow of current through the first said valve, of means responsive to operation of said current interrupting means for controlling the first and second said conductivity controlling means to reduce the conductivities of the first and second said valves by different amounts.

15. In an electric translating system, the combination with an electric current supply circuit, an electric current load circuit, a first electric valve means interconnecting said circuits and comprising a path for the flow of current therebetween, means for controlling said flow of current comprising means for controlling the conductivity of said valve means, and means for interrupting said flow of current, of a second electric valve means interconnecting said circuits and comprising a path for the flow of current therebetween, means for controlling the flow of current through the second said valve means comprising means for controlling the conductivity thereof, and means responsive to the flow of current greater than a predetermined magnitude through the first said valve means for controlling the first said conductivity controlling means in such sense as to render the first said valve means non-conductive, for causing operation of the said interrupting means and for controlling the second said conductivity controlling means in such sense as to reduce the conductivity of the said second valve means a predetermined degree greater than zero.

16. In an electric translating system, the combination with an electric current supply circuit, an electric current load circuit, a first plurality of electric valves severally interconnecting said circuits and comprising paths for the flow of current therebetween, and means for controlling said flow of current comprising means for controlling the conductivity of said valves, of a second plurality of electric valves interconnecting said circuits and comprising paths for the flow of current therebetween, means for controlling said flow of current through the said second plurality of valves comprising means for controlling the conductivity thereof, means for interrupting said flow of current through the said second plurality of valves, and means operable responsive to the operation of the said interrupting means for controlling the said conductivity controlling means for each said plurality of valves in such sense as to reduce the conductivity thereof a predetermined degree greater than zero.

17. In an electric translating system, the combination with an electric current supply circuit, an electric current load circuit, a first plurality of electric valves interconnecting said circuits and comprising paths for the flow of current therebetween, means for controlling said flow of current comprising means for controlling the conductivity of said valves, and means for interrupting said flow of current, of a second plurality of electric valves interconnecting said circuits and comprising paths for the flow of current therebetween, means for controlling said flow of current through the second said plurality of valves comprising means for controlling the conductivity thereof, means for interrupting the flow of current through the second said plurality of valves, and means operable responsive to the operation of either of said interrupting means for controlling the conductivity controlling means for each said plurality of valves in such sense as to reduce the conductivity thereof a predetermined degree greater than zero.

HAROLD WINOGRAD.